Jan. 1, 1929.
Re. 17,184
E. R. WOLF
SHOCK ABSORBER
Original Filed Nov. 20, 1924
Fig. 1.
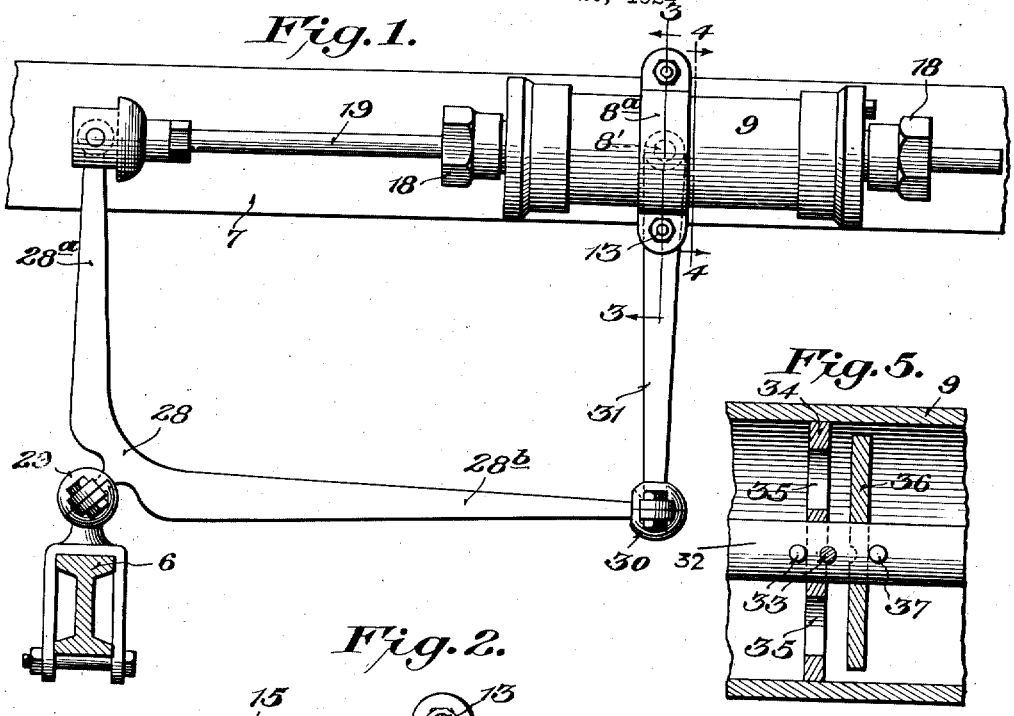
Fig. 5.
Fig. 2.
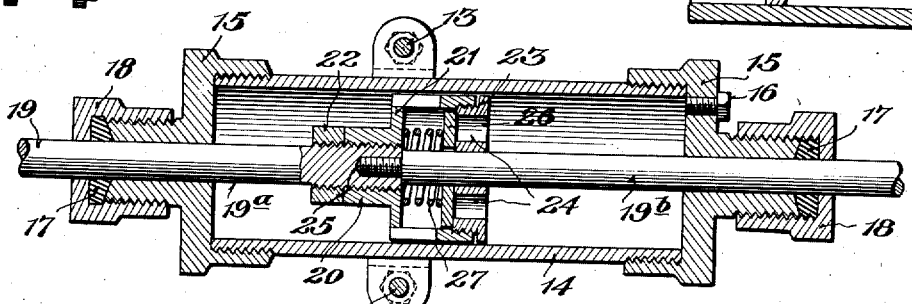
Fig. 3.
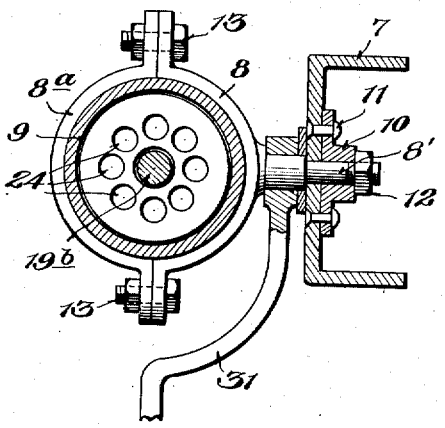
Fig. 4.
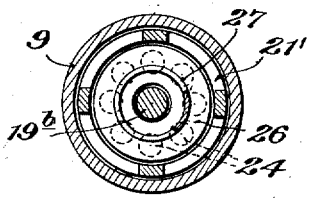
INVENTOR.
Edward R. Wolf
BY
Cameron, Kirkham & Sutton
ATTORNEYS.

Reissued Jan. 1, 1929. Re. 17,184

UNITED STATES PATENT OFFICE.

EDWARD R. WOLF, OF MIAMI, FLORIDA

SHOCK ABSORBER.

Original No. 1,554,249, dated September 22, 1925, Serial No. 751,165, filed November 20, 1924. Application for reissue filed June 6, 1927. Serial No. 196,978.

This invention relates to shock absorbers and more particularly to shock absorbers of the hydraulic type for use on automobiles.

Difficulty has heretofore been experienced in shock absorbers of this type since it is not always possible to completely fill the cylinders of the same with liquid. This results from the fact that the piston rod extends into the cylinder in varying amounts depending on the force of the shock to be absorbed, and a space must be left in the cylinder equal to the maximum displacement of the rod. The fact that the cylinder is not completely filled with liquids results in a noticeable jar at the instant that the device starts to absorb a shock.

Difficulty has also been experienced in mounting hydraulic shock absorbers on automobiles in such a manner as to provide for the side sway of the body relative to the supporting axles.

An object of the present invention is to overcome the above defects by providing an improved hydraulic shock absorber which is so constructed that the cylinder may be completely filled with liquid, and which is so mounted that the side sway of the body will in no way affect the proper functioning of the device.

Another object of this invention is to provide novel means for permitting substantially free flow of the liquid past the same in the cylinder when the automobile body and axle have relative movement towards each other, and to resist flow of the liquid past the same when said body and axle have relative movement away from each other.

Another object of the invention is to provide novel motion-transmitting means for the device which is so constructed that the cylinder normally assumes a horizontal position, thereby decreasing the space required for its installation.

Other objects of the invention are to provide a device which is inexpensive to manufacture, simple and rugged in construction and one which may be readily applied to automobiles now in use.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

In the drawings:—

Fig. 1 is a side elevation illustrating one embodiment of the inventive idea;

Fig. 2 is a longitudinal sectional view, somewhat enlarged, of the cylinder and fluid controlling means;

Figs. 3 and 4 are sectional views taken on the lines 3—3 and 4—4, respectively, of Fig. 1; and Fig. 5 is an enlarged detail view, in section, illustrating a second type of means for controlling the flow of liquid in the cylinder.

Referring to the drawings, wherein like reference numerals refer to like parts throughout the several views, 6 is an axle and 7 a portion of an automobile body, the latter being mounted on the axle in any suitable manner known in the art, as by means of springs (not shown). Secured to the body portion 7 at a suitable point is a supporting member 8 for a liquid containing cylinder 9. Preferably, member 8 is provided with an inwardly extending spindle or pivot portion 8′ which freely turns in, and is supported by, the body portion 7. A bracket 10 of any suitable type may be secured to the inner surface of portion 7, as by means of rivets 11, to provide a bearing surface for spindle 8′ and to strengthen the body at the point where the spindle passes through the same. Retaining means, such as nut 12, is preferably employed for securing member 8 in position. If desired, the member 8 may be formed in two parts, the outer portion or strap $8^a$ surrounding the outer half of the cylinder 9 and being secured to the inner portion by means of bolts 13. Such a mounting permits cylinder 9 to move in a vertical plane.

In the form shown, the cylinder comprises a tubular portion 14 threaded at its opposite ends to receive cylinder heads 15. A filling plug 16 may be threaded or otherwise removably secured in one of the cylinder heads to permit the cylinder to be filled with liquid. Each of the cylinder heads is provided with packing 17 and a suitable gland nut 18, which latter surrounds piston rod 19. As shown in Fig. 2, the rod 19 extends through the opposite ends of the cylinder and may be formed in two sections $19^a$ and $19^b$ to facilitate assembly of the parts. The inner end of the section $19^a$ is exteriorly threaded as at 20, to receive a valve cage 21 which may be retained in position by means of a lock nut 22. Preferably, the cage 21 has an outside diameter substantially less than the inside diameter of the cylinder, and is provided with ports or openings 21′, while the inner periphery of the cage is threaded to receive a flanged disc 23 provided with a plurality of openings 24. Extending through a central opening in disc 23 is the section $19^b$ of the piston rod which is preferably of reduced diameter at its inner end. This reduced portion is exteriorly threaded and extends into a cup 25 formed in the inner end of rod section $19^a$. Slidably mounted on rod section $19^b$, and within the cage 21, is a disc valve 26 which is normally maintained in seated position on disc 23 by means of a spring 27 surrounding section $19^b$ and interposed between said valve and the cage 21.

Suitable means are provided for operatively connecting the rod 19 to the axle 6 whereby relative movement of the body portion 7 and axle 6 is transmitted to said rod but side sway of the body will not prevent the proper functioning of the device. As shown, this means comprises a bell crank lever 28 which is connected at its central portion by suitable universal joint means 29 to the axle 6. The vertical arm $28^a$ of the bell crank lever is pivotally connected in any suitable manner to one end of rod 19 while the horizontal arm $28^b$ of said lever is pivotally connected by universal joint means 30 to a vertical link 31. The upper end of the latter is preferably pivotally connected to the cylindrical stem 8′ of supporting member 8 between body portion 7 and the cylinder 9.

*Operation.*—When the irregularities of the surface over which the vehicle is moving cause relative movement of the body portion 7 toward axle 6, arm $28^b$ is forced downwardly by link 31, the lever 28 swinging about the joint means 29. Arm $28^a$ is forced to the right, as viewed in Fig. 1, carrying with it rod 19 and the piston elements, and the left hand end of cylinder 9 is simultaneously swung upwardly about spindle 8′. The pressure of the liquid on the valve disc 26 moves the latter to the left, compressing the spring 27, uncovering ports 24 and 21′, and permitting free passage of the piston elements through the liquid. On the rebound, when the body and axle have relative movement away from each other, the valve 26 is forced onto its seat and the piston elements and rod 19 move back slowly to normal position as the liquid flows through the annular space between the valve cage 21 and the walls of the cylinder 9. Since the piston rod 19 at all times extends through the opposite ends of the cylinder, regardless of the position of the piston elements, the displacement of the piston rod is at all times the same, and the cylinder may be completely filled with liquid. The sectional construction of rod 19 greatly facilitates the assembly of the parts.

Fig. 5 illustrates another manner in which the piston elements may be formed. As shown, the piston rod 32 is integral throughout its length and at suitable points is provided with openings to receive a pair of pins 33 which extend through the rod to serve as retaining elements for a disc 34 which surrounds rod 32 and which is provided with a suitable number of openings 35. Slidably mounted on rod 32 is a second disc 36 having an outer diameter that is much smaller than the inner diameter of the cylinder. A pin 37 extending through rod 32 serves as a stop to limit the movement of disc 36 away from the ported disc 34. Since the discs 34 and 36 are symmetrically formed and the pressure on the faces thereof is the same at all points, there is no tendency for the discs to cant and bind in the cylinder. Movement of rod 32 in one direction results in disc 36 being moved to a position adjacent pin 37, uncovering ports 35, thereby permitting the piston elements to move freely through the liquid. Movement of rod 32 in the opposite or rebound direction, results in disc 36 being moved to cover the ports 35, whereby movement of the rod 32 is effectively checked.

The invention is capable of receiving a variety of mechanical expressions, some of which will now readily suggest themselves to those skilled in the art, while changes may be made in the details of construction and arrangement without departing from the spirit of the invention. Reference is therefore to be had to the claims hereto appended for a definition of the limits of the invention.

What I claim is:—

1. A hydraulic shock absorber comprising in combination with a body and a supporting axle, a cylinder carried by said body, a piston in said cylinder, a rod for said piston extending through the opposite ends of the cylinder, a bell crank lever fulcrumed at its elbow on said axle, means pivotally connecting one arm of said lever to said rod, and a member pivoted to said body and the other arm of said lever.

2. A device of the class described comprising in combination with an automobile body and a supporting axle, a liquid containing cylinder pivotally secured to said body for pivotal movement in a vertical plane, a piston in said cylinder, a rod secured to the piston and having its opposite ends extending through the ends of the cylinder, a bell crank lever, universal joint means connecting said lever to said axle, means for pivotally connecting the lever to said rod, a member pivotally connected to said body, and universal joint means connecting said member and lever.

3. A device of the class described comprising in combination with an automobile body and a supporting axle, a liquid containing cylinder secured to said body for pivotal movement in a vertical plane, means slidable in said cylinder for permitting free flow of the liquid when moved in one direction and opposing the flow of liquid past the same when moved in the opposite direction, a rod secured to said means extending through the opposite ends of the cylinder, a lever, universal joint fulcrum connecting said lever to said axle, means connecting one arm of the lever to said rod, and a member pivotally connected to the other arm of said lever and said body.

4. A device of the class described comprising, in combination with an automobile body and a supporting axle, a liquid-containing cylinder mounted on said body to turn in a vertical plane relative to said body, a rod extending through the opposite ends of said cylinder and slidable therein, a piston carried by the rod, a bell-crank lever fulcrumed at its elbow on said axle, a pivotal connection between one arm of said lever and said piston rod, and a link pivotally connected to the body at one end and to the other arm of said lever at its opposite end.

5. A device of the class described comprising in combination with an automobile body and a supporting axle, a liquid-containing cylinder, a member pivotally connecting said cylinder to said body, a piston rod for said cylinder, a piston secured to the rod and slidable in said cylinder, a bell crank lever connected to said axle for universal movement, means pivotally connecting one arm of said lever to said rod, a connecting element pivotally connected to said member, and universal joint means connecting said element to the other arm of said lever.

6. A device of the class described, comprising in combination with a body and a supporting member therefor, a cylinder pivotally connected to said body, a rod extending through the opposite ends of the cylinder, fluid-controlling means carried by the rod within said cylinder, said means consisting of a flat disc having a center opening through which said rod passes and having ports passing therethrough, pins passing through the said rod one on either side of said disc, a member slidable on the rod to cover the ports in said disc, and means for limiting the movement of said slidable member.

7. In a shock absorber, in combination with a body and a supporting member therefor, a cylinder designed to be completely filled with liquid, a rod extending through the opposite ends of said cylinder, means operatively connecting said cylinder and rod with said body and support, said means including connections permitting relative movement about angularly related axes and fluid controlling means carried by said rod within said cylinder, said fluid controlling means comprising a piston mounted on said rod and having a relatively large ported area to permit relatively free flow of liquid therethrough, and means moved by the pressure of the liquid to completely open the ported area or to close the same in order to permit said piston to move relatively freely in one direction and with checked movement in the opposite direction.

8. In a shock absorber, in combination with a body and a supporting member therefor, a cylinder designed to be completely filled with liquid, a rod extending through the opposite ends of said cylinder, means operatively connecting said cylinder and rod with said body and support, said means including connections permitting relative movement about axes disposed at right angles and fluid controlling means carried by said rod within said cylinder, said fluid controlling means comprising a piston mounted on said rod and having a relatively large ported area to permit relatively free flow of liquid therethrough, a member movable on said rod by the pressure of said liquid to completely open the ported area or to close the same in order to permit said piston to move relatively freely in one direction and with checked movement in the opposite direction, and means on said rod to limit the opening movement of said member.

9. In a shock absorber, in combination with a body and a supporting member therefor, a liquid-containing cylinder, a rod extending through the opposite ends of said cylinder, means operatively connecting said cylinder and rod with said body and support, said means including connections permitting relative movement about angularly related axes, and fluid controlling means within said cylinder, said fluid controlling means comprising a piston mounted on said rod and provided with a relatively large ported area which occupies a sufficient portion of the area of the piston between its periphery and said rod to permit relatively free flow of the liquid therethrough, and means moved by the pressure of the liquid to completely open the ported area or to close the same in order to permit said piston to move relatively freely in one direction and with checked movement in the opposite direction.

10. In a shock absorber, in combination with a body and a supporting member therefor, a cylinder designed to be completely filled with liquid, a rod extending through the opposite ends of said cylinder, means operatively connecting said cylinder and rod with said body and support, said means including connections permitting relative movement about angularly related axes and fluid controlling means carried by said rod within said cylinder, said fluid controlling means comprising a piston mounted on said rod and having a relatively large ported area to permit relatively free flow of liquid therethrough, said piston providing a clearance therebetween and said cylinder, and means moved by the pressure of said liquid to completely open the ported area or to close the same in order to permit said piston to move relatively freely in one direction and with checked movement in the opposite direction.

11. In a shock absorber, in combination with a body and a supporting member therefor, a cylinder designed to be completely filled with liquid, a rod extending through the opposite ends of said cylinder, means operatively connecting said cylinder and rod with said body and support, said means including connections permitting universal relative movement and fluid controlling means carried by said rod within said cylinder, said fluid controlling means comprising a piston mounted on said rod and having a relatively large ported area to permit relatively free flow of liquid therethrough, said piston providing a clearance therebetween and said cylinder, a disc movable on said rod by the pressure of said liquid to completely open the ported area or to close the same in order to permit said piston to move relatively freely in the opposite direction, and means on said rod to limit the opening movement of said disc.

In testimony whereof I have signed this specification.

EDWARD R. WOLF.